United States Patent [19]

Hund, Jr.

[11] Patent Number: 4,647,267
[45] Date of Patent: Mar. 3, 1987

[54] FORK AND ARM MECHANISM FOR REFUSE CONTAINER

[75] Inventor: Henry M. Hund, Jr., Knoxville, Tenn.

[73] Assignee: Dempster Systems Inc., Knoxville, Tenn.

[21] Appl. No.: 731,096

[22] Filed: May 6, 1985

[51] Int. Cl.$^4$ ............................................. B65F 3/04
[52] U.S. Cl. ...................................... 414/408; 91/508
[58] Field of Search ............. 414/406, 408, 419, 420, 414/421, 546, 553, 685; 91/167 R, 508, 509, 520, 533

[56] References Cited

U.S. PATENT DOCUMENTS

| | | | |
|---|---|---|---|
| 2,893,204 | 7/1954 | Colley | 91/167 |
| 3,122,249 | 2/1964 | Dempster et al. | 414/408 |
| 3,122,250 | 2/1964 | French et al. | 414/408 |
| 3,130,845 | 4/1964 | French et al. | 414/406 |
| 3,130,846 | 4/1964 | Wender | 414/408 |
| 3,138,275 | 6/1964 | Dempster et al. | 414/408 |
| 3,827,587 | 8/1974 | Liberman et al. | 414/420 |
| 3,882,759 | 5/1975 | Formwalt et al. | 91/167 |
| 4,034,649 | 7/1977 | Harvey et al. | 91/412 |
| 4,192,222 | 3/1980 | Dits | 91/520 X |
| 4,349,305 | 9/1982 | Wynn et al. | 414/408 |
| 4,527,461 | 7/1985 | Ogura | 91/519 |
| 4,547,118 | 10/1985 | Pittenger | 414/408 |

OTHER PUBLICATIONS

E. Lennemann, IBM Technical Disclosure Bulletin, Linear Motor for Positioning and Servo Control, Mar. 1973, vol. 15, No. 10, pp. 3270-3271.

*Primary Examiner*—Joseph E. Valenza
*Assistant Examiner*—David A. Bucci
*Attorney, Agent, or Firm*—Jacox & Meckstroth

[57] ABSTRACT

Arm and fork mechanism for moving a refuse retainer with respect to a refuse container which has an opening in the upper portion thereof. Arms are pivotally mounted adjacent the refuse container. The arms are movable between a position adjacent a side portion of the refuse container and are also movable to a position above the refuse container. A plurality of forks is supported by the arms and angularly movable with respect to the arms. A fluid motor is operably joined to the arms and operably joined to the forks for angularly moving the forks with respect to the arms. The fluid motor is provided with a plurality of operation positions. Thus, the forks are angularly movable by the fluid motor to any one of a plurality of angular positions for lifting and dumping a refuse retainer.

6 Claims, 11 Drawing Figures

FORK AND ARM MECHANISM FOR REFUSE CONTAINER

BACKGROUND OF THE INVENTION

Certain types of refuse containers have an opening in the upper portion thereof through which refuse is dumped into the container. Some of such refuse containers have in combination therewith an arm and fork unit which is operable to lift a refuse retainer and to move the refuse retainer to a position over the opening and to discharge the refuse from the retainer into the refuse container through the opening therein. Most of such refuse containers are carried by a vehicle for movement of the refuse container.

Most of such arm and fork units have limited fork movement. The limited fork movement creates a problem. For example, when the arms are positioned above the refuse container, the forks cannot be moved to a horizontal position at the top surface of the container. Therefore, such forks extend upwardly from the upper surface of the container and create problems in the movement of a refuse container carrier vehicle along a highway which has limited height regulations. In such arm and fork units, the arms and forks must be positioned at the front of the vehicle before travel occurs. Such a position of the arms and forks at the front of the vehicle partially obstructs and limits the visibility of an operator of the vehicle which carries the container.

Frequently for short distance travel of the vehicle which carries a refuse container it is desired to maintain the forks at the front of the vehicle during travel. However, in known arm and fork units, the forks can extend only forwardly of the vehicle which carries the refuse container. The forks in such units cannot be moved to a vertical position. The forwardly extending forks present hazard conditions.

It is an object of this invention to provide a fork and arm mechanism for a refuse container in which the forks are pivotally movable throughout a relatively large angle. Thus, the forks can be positioned horizontally at the upper surface of the refuse container during travel of the refuse container. Also, the forks can be moved to a position in juxtaposition with the arms at any position of the arms. Thus, the forks can be vertically oriented when the forks are positioned in front of a vehicle which carries the refuse container.

It is another object of this invention to provide such a fork and arm mechanism which is capable of rapid pivotal movement of the forks.

Other objects and advantages of this invention reside in the construction of parts, the combination thereof, the method of production and the mode of operation, as will become more apparent from the following description.

SUMMARY OF THE INVENTION

This invention comprises a fork and arm mechanism for a refuse container. The invention also comprises motor means for operation of the forks in the fork and arm mechanism. The motor means comprises a reciprocally operable fluid motor which includes an elongate housing. Within the elongate housing are a plurality of axially aligned spaced-apart pistons, all of which are secured to a common piston rod. The piston rod extends from the housing. The housing is provided with a plurality of spaced-apart fluid ports. Fluid which flows into and out of the fluid ports is controlled so that fluid pressure is applied selectively to the pistons, and thus axial movement and positioning of the piston rod are controlled.

The mechanism includes a pair of spaced-apart arms which are pivotally carried by the refuse container. A pivotal shaft extends between the arms. A pair of fluid motors is carried by the arms. The fluid motors are operably joined to the shaft which is carried by the arm members. A pair of forks is attached to the shaft. The fluid motors operate together to pivotally move the shaft and the forks. At any pivotal position of the arms the forks are pivotally movable through a relatively wide angle. By this means a refuse retainer is lifted by the forks and arms and moved to a position above the opening in the upper portion of the refuse container. The forks then are moved pivotally to tilt the refuse retainer to deposit the refuse from the refuse retainer into the refuse container through the opening in the refuse container.

BRIEF DESCRIPTION OF THE VIEWS OF THE DRAWINGS

FIG. 2 is drawn on a larger scale than FIG. 1. This view shows the same arm position as FIG. 1, and illustrates another angular position of the forks at this arm position.

DETAILED DESCRIPTION OF THE INVENTION

Figure 1:
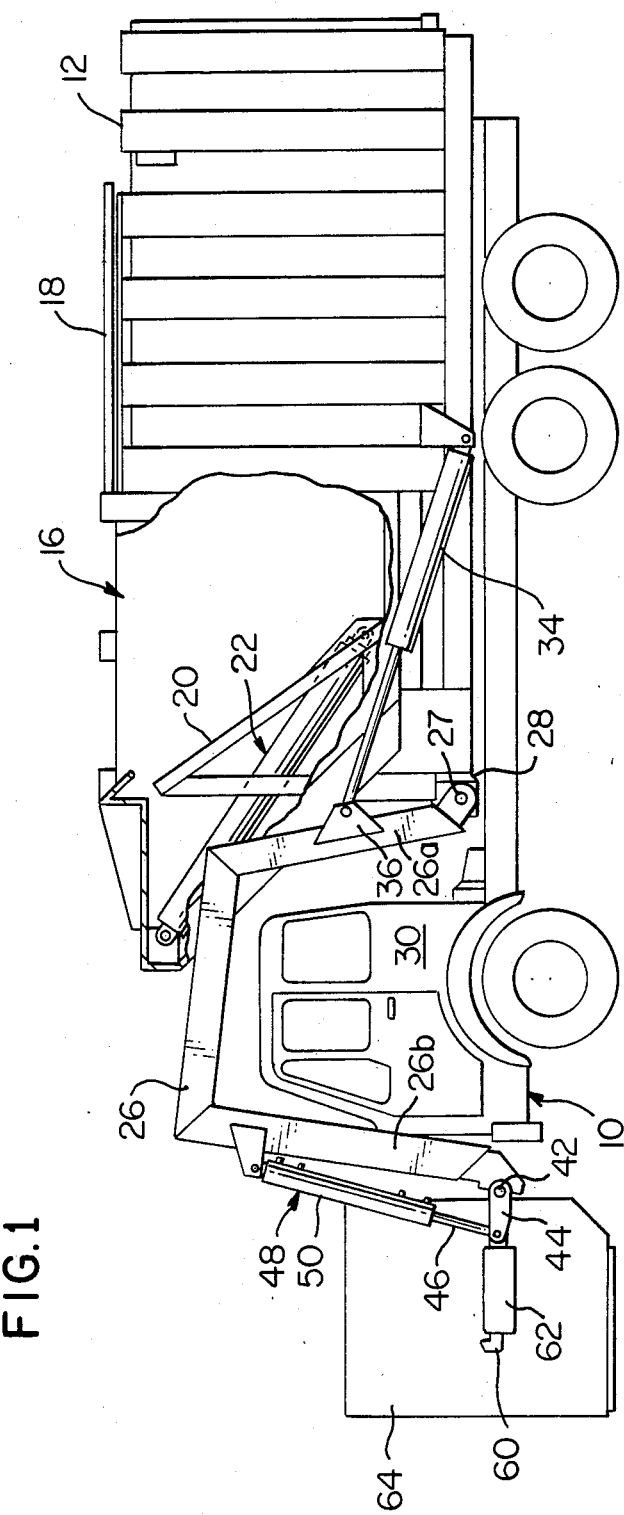
FIG. 1 is a side elevational view with parts broken away and shown in section showing a refuse container and a vehicle which carries the refuse container. This view also illustrates one of the arm positions and illustrates the manner in which the arms and forks are positioned for lifting a refuse retainer for movement of the refuse retainer to a position above the refuse container for dumping the contents of the refuse retainer into the refuse container.

FIG. 1 shows generally a vehicle 10 upon which is mounted a refuse container 12 which has an opening 16 in the upper portion thereof. The opening 16 is closeable by a door 18. A packer member 20 and a power unit 22 for operation of the packer member 20 are shown within the refuse container 12.

Figure 2:
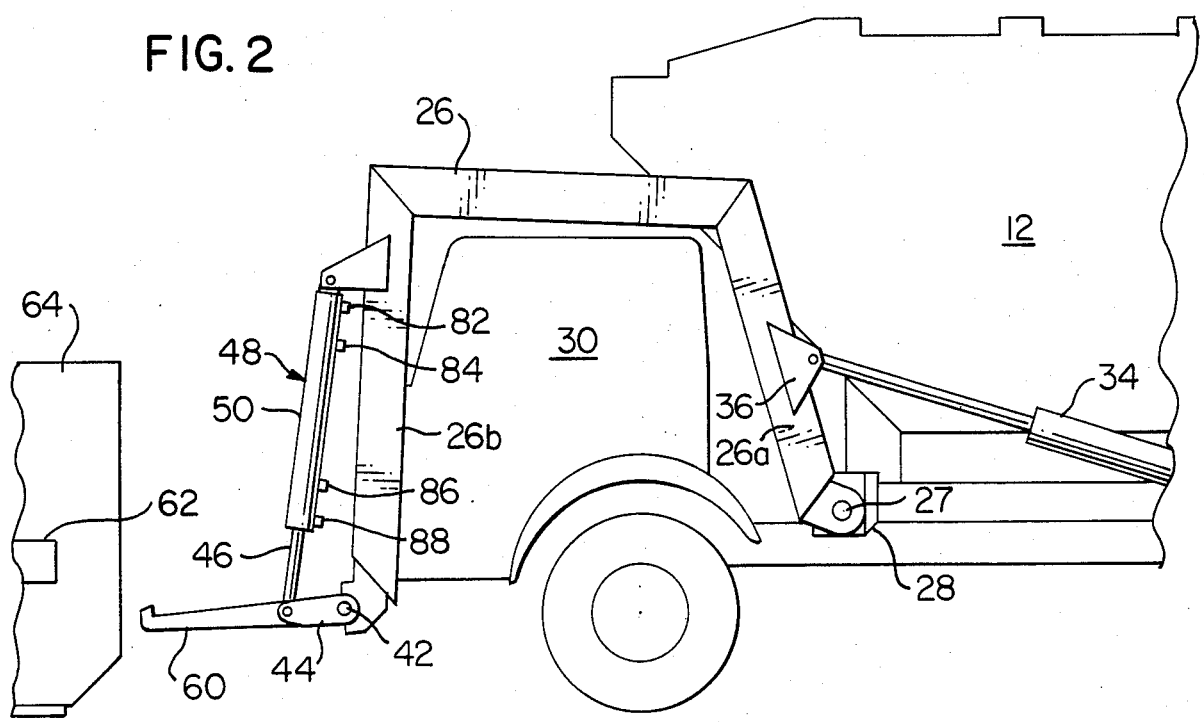
FIG. 2 is a fragmentary side elevation view of an arm and fork unit of this invention and also shows the refuse container and supporting vehicle.

An arm member 26 is mounted on each of the opposite sides of the refuse container 12. Each arm member 26 is pivotally attached by means of a pin 27 to a base 28 of the refuse container 12. Each of the arms 26 is shown as having a connection portion 26a and a carrier portion 26b. In FIGS. 1 and 2 the arms 26 are shown in a position extending over a cab 30 of the vehicle 10. The arms 26 are joined together and are pivotally moved by linearly operable fluid motors 34. Each fluid motor 34 is pivotally attached to the base 28 of the refuse container 12 and is also pivotally attached to a bracket 36 which is joined to the connection portion 26a of one of the arms 26.

Figure 7:
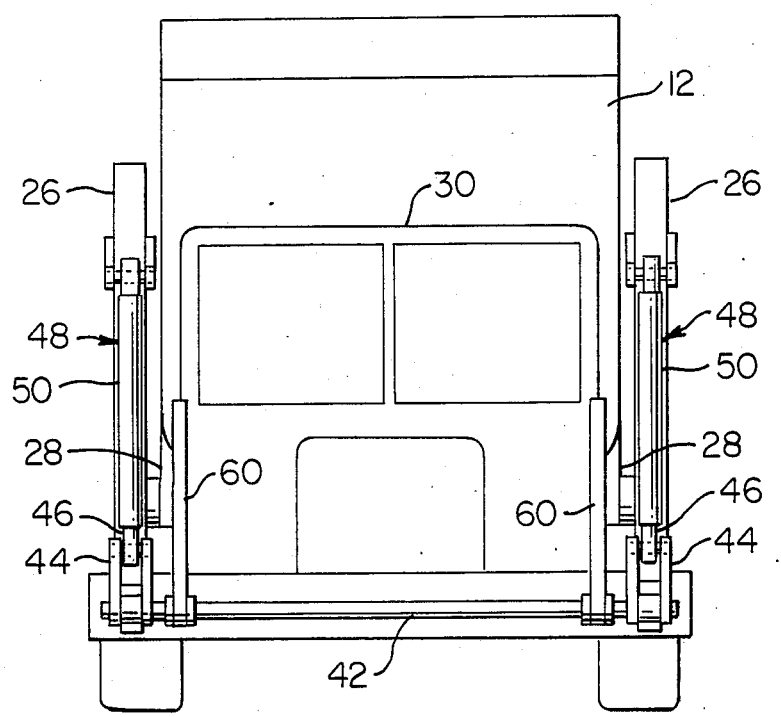
FIG. 7 is a front elevational view showing the arm and fork unit.

In FIGS. 1, 2, and 7 the carrier portion 26b of each arm 26 is shown positioned in front of the cab 30. Pivotally supported at the lower end of the carrier portion 26b of the arms 26 is a shaft 42 which extends between the arms 26. Attached to the shaft 42 adjacent each of the arms 26 is a bifurcated link 44. Pivotally attached to each bifurcated link 44 is an actuator rod 46 of a reciprocally operable fluid motor 48. The fluid motor 48 also has an elongate housing 50, the upper part of which is pivotally attached to a bracket which is attached to the carrier portion 26b of the arm 26.

Attached to the shaft 42 adjacent the arms 26 and the bifurcated links 44 are a pair of spaced-apart forks 60. The forks 60 pivotally move with rotative movement of the shaft 42.

Figure 3:
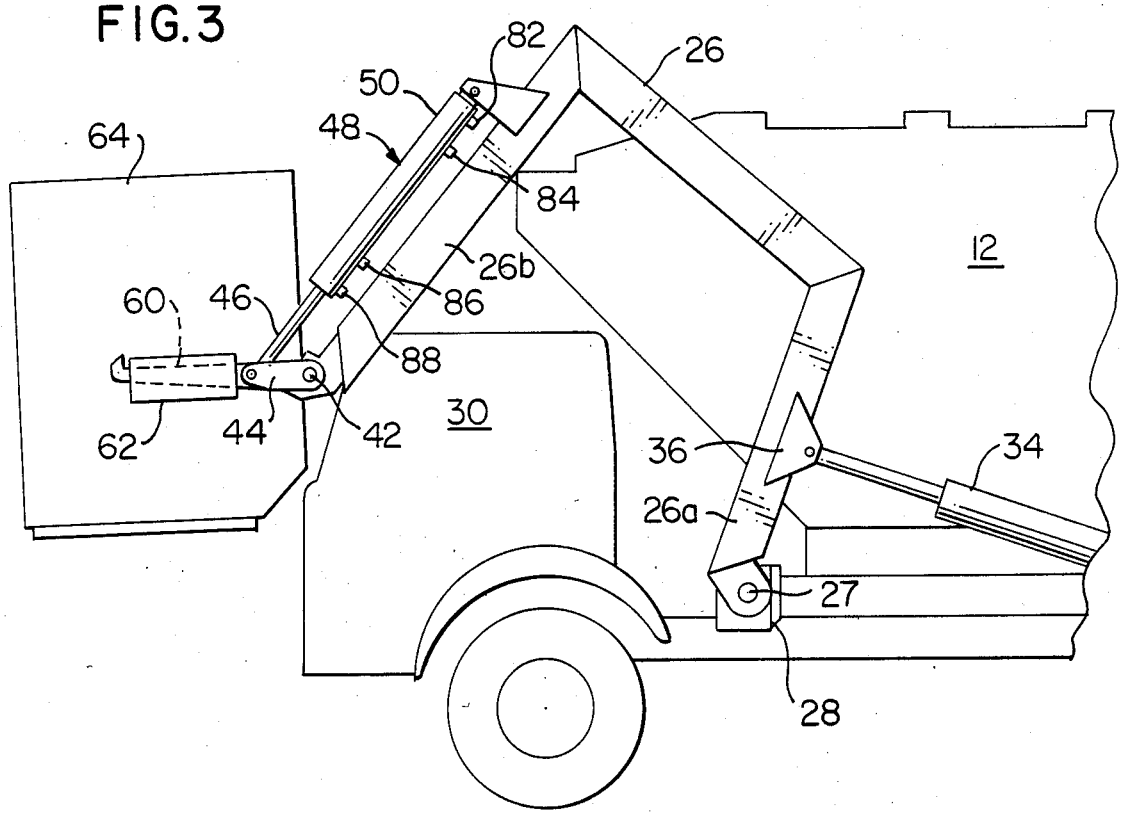
FIG. 3 is a fragmentary side elevational view, similar to FIG. 1, drawn on substantially the same scale as FIG. 2, illustrating another arm position during lifting and lowering of a refuse retainer and illustrating another angular position of the forks at this arm position.
Figure 4:
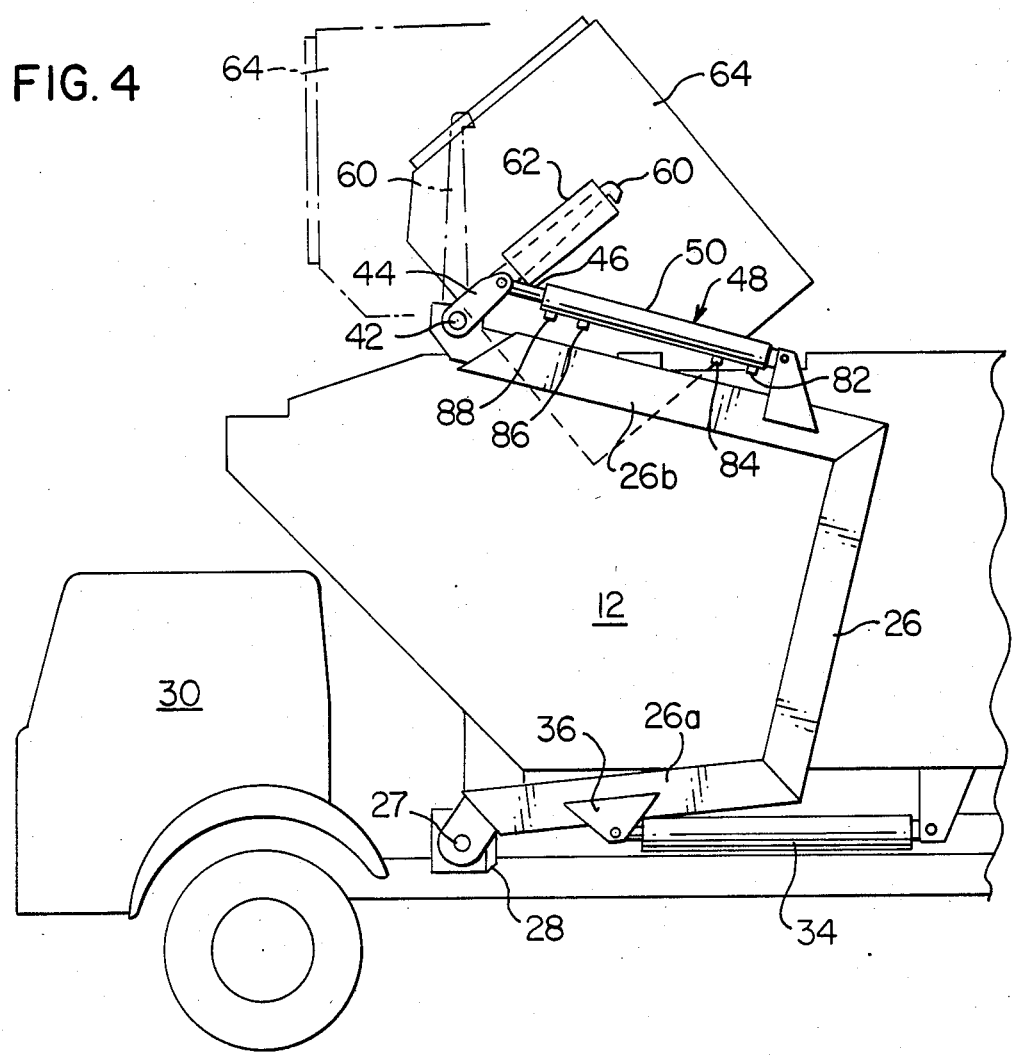
FIG. 4 is a fragmentary side elevational view, similar to FIGS. 2 and 3 illustrating another arm position. At this arm position dumping of a refuse retainer occurs. This view also illustrates angular fork positions at this arm position.
Figure 6:
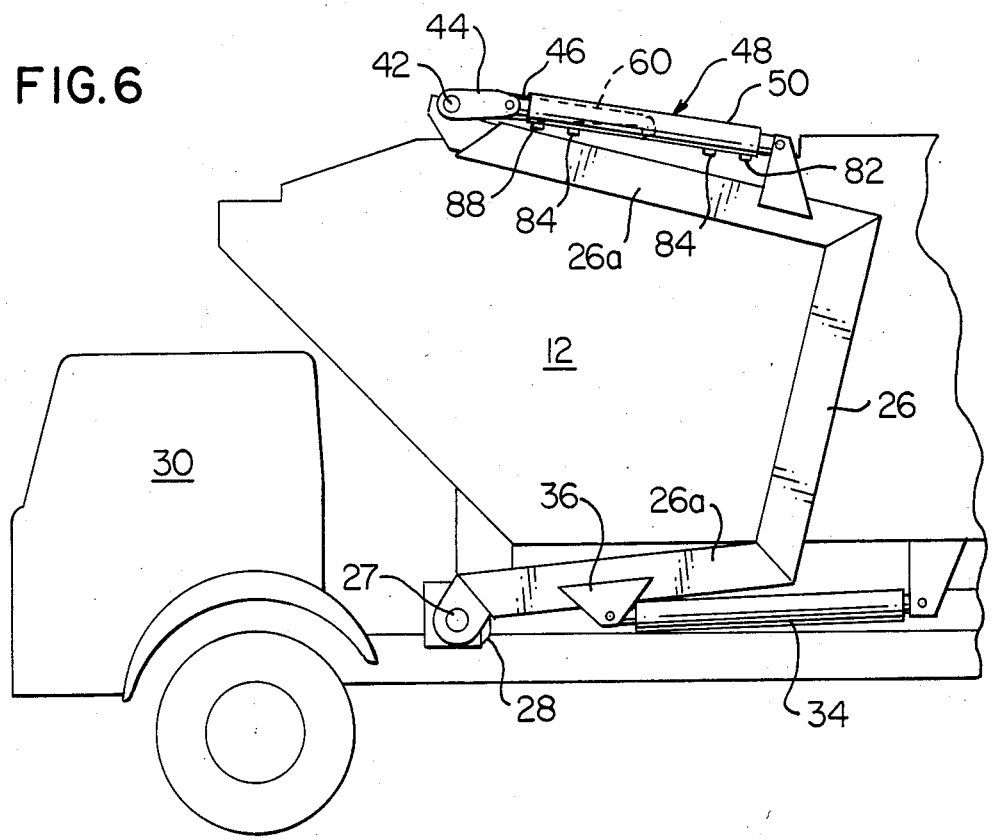
FIG. 6 is a fragmentary side elevational view of the arms and forks, showing the arms positioned in the manner illustrated in FIG. 4, but showing the forks in another angular position.

The arms 26 are movable by the fluid motors 34 between the position of the arms 26 shown in FIGS. 1 and 2 and the position of the arms 26 shown in FIGS. 4 and 6. In the position of the arms 26 and the forks 60 as shown in FIG. 1, the forks 60 are substantially horizontal and are positioned to move into sleeves 62 of a refuse retainer 64. In order for the forks 60 to move into the sleeves 62 the vehicle 10 is driven forwardly. After the forks 60 are moved into the sleeves 62 of the refuse retainer 64 the arms 26 are pivotally moved to the position thereof shown in FIG. 3. Thus, the refuse retainer 64 is moved to the position thereof shown in FIG. 3. During movement of the arms 26 from the position thereof shown in FIG. 1 to the position thereof shown in FIG. 3, the forks 60 are pivotally moved with respect to the arms 26. Therefore, when the arms 26 are positioned as shown in FIG. 3, the forks 60 are substantially horizontal and the refuse retainer remains horizontal.

Then the arms 26 are pivotally moved to the position thereof shown in FIG. 4. During the movement of the arms 26 from the position shown in FIG. 3 to the position shown in FIG. 4, the forks 60 remain substantially at the same angle with respect to the arms 26, as shown in broken lines in FIG. 4. Thus, as the arms 26 reach the position thereof shown in FIG. 4, tilting and tipping of the refuse retainer 64 has begun. Then the forks 60 are pivotally moved to the position shown in solid lines in FIG. 4, and tilting and tipping of the refuse retainer 64 is completed for dumping the contents of the refuse retainer 64 into the refuse container 12.

Then the arms 26 and the forks 60 are pivotally returned to the positions thereof shown in FIG. 3 and then to the positions thereof shown in FIG. 1.

FIGS. 8, 9, 10, and 11 illustrate one of the fluid motors 48 and the operating positions thereof. Each of the fluid motors 48, as stated above and as shown, has an actuator rod 46 and a housing 50. As shown in FIGS. 8, 9, 10, and 11, within the housing 50 are a plurality of spaced-apart axially aligned pistons 70, 72, and 74, all of which are secured to the actuator rod 46. The housing 50 has a plurality of spaced-apart ports 82, 84, 86, and 88. A source of fluid is joined to each of the ports 82, 84, 86, and 88.

Figure 11:
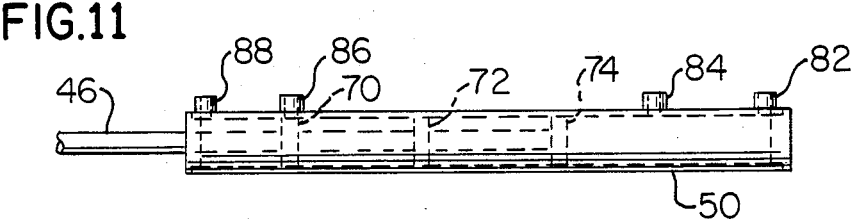
FIG. 11 is a diagrammatic side sectional view, similar to FIGS. 8, 9, and 10, illustrating the piston and piston rod positions when the forks are in another position witn respect to the arms.

When it is desired to move the forks 60 to the position thereof with respect to the arms 26, as shown in FIG. 1 fluid is introduced into the housing 50 through the ports 82 and 84. Fluid is exhausted through the port 86, and the port 88 is blocked against fluid flow. This condition of the fluid motor 48 is illustrated in FIG. 11.

Figure 9:
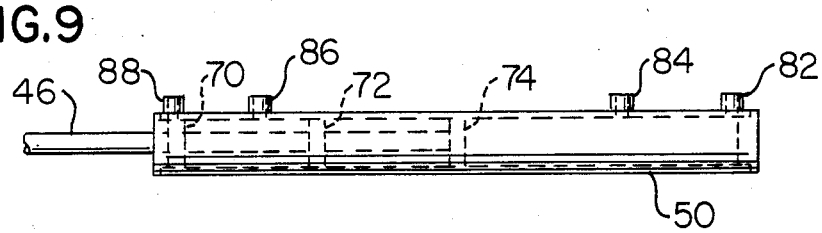
FIG. 9 is a diagrammatic side elevational view, similar to FIG. 8, illustrating the piston and piston rod positions when the forks are in another position with respect to the arms.

To position the forks 60 with respect to the arms 26 as shown in FIG. 3, fluid is introduced into the housing 50 through the ports 82 and 84, and fluid is exhausted from the housing 50 through the ports 88 and 86. This condition of the fluid motor 48 is illustrated in FIG. 9.

Figure 10:
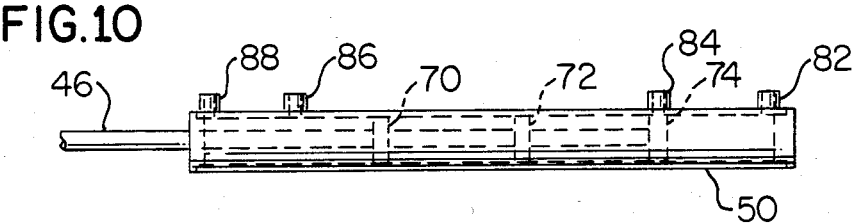
FIG. 10 is a diagrammatic side sectional view, similar to FIGS. 8 and 9, illustrating the piston and piston rod positions when the forks are in another position with respect to the arms.

When the arms 26 are positioned as illustrated in FIG. 4, to position the forks 60 with respect to the arms 26 as shown in solid lines in FIG. 4, fluid is introduced into the housing 50 through the ports 88 and 86. Fluid is exhausted through the port 84. Port 82 is blocked against fluid flow. This condition of the fluid motor 48 is illustrated in FIG. 10.

Figure 5:
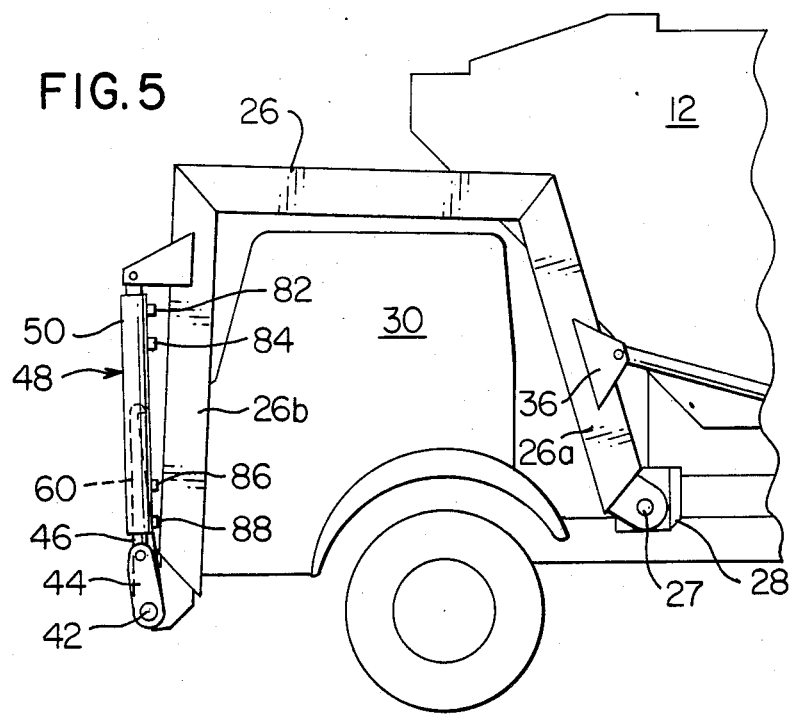
FIG. 5 is a fragmentary side elevational view of the arm and fork unit, showing the arms positioned in the manner illustrated in FIG. 2, but showing the forks in another angular position.
Figure 8:
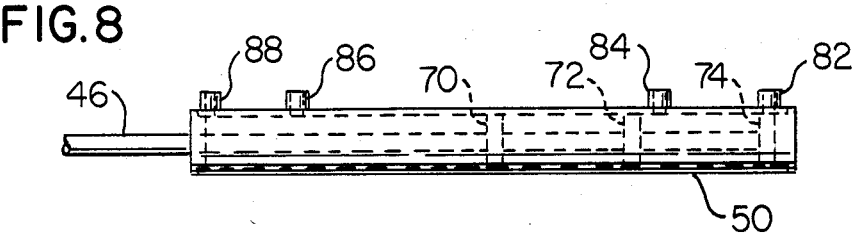
FIG. 8 is a diagrammatic side elevational view of a fluid operable motor of this invention and illustrating the piston and piston rod positions when the forks are in a predetermined position thereof with respect to the arms.

FIG. 5 illustrates a position of the forks 60 when the forks 60 are in front of the cab 30 of the vehicle 10. The forks 60 are adjacent the arms 26 and substantially parallel thereto. Due to the fact that this position of the forks 60 is unobtrusive, this is an excellent position for the forks 60 when the vehicle 10 travels. When the forks 60 are so positioned, the condition of the fluid motor 48 is as shown in FIG. 8. Fluid is introduced into the housing 50 through the ports 88 and 86 and fluid is exhausted from the housing 50 through the ports 82 and 84.

FIG. 6 illustrates a position of the forks 60 when the forks are positioned above the refuse container 12. The forks are adjacent the upper surface of the refuse container 12 and substantially parallel thereto. This is an excellent position for the forks 60 during travel of the vehicle 10, due to the fact that the total height of the structure is a minimum. Furthermore, in the positions of the arms 26 and forks 60 as shown in FIG. 6, the arms 26 and the forks 60 do not obstruct the vision of the driver of the vehicle 10 during travel of the vehicle 10. In order to pivotally position the forks 60 with respect to the arms 26 as illustrated in FIG. 6, fluid is forced into the housing 50 through the ports 86 and 88. Fluid is exhausted through the ports 82 and 84. This condition is illustrated in FIG. 8.

Thus, it is understood that the fork operator mechanism of this invention is capable of pivotal movement of the forks throughout a wide angle of operation. The mechanism is capable of positioning the forks in excellent positions for vehicle travel as well as for lifting and dumping of a refuse container. The mechanism is also capable of relatively rapid fork movement.

Although the preferred embodiment of the mechanism of this invention has been described, it will be understood that within the purview of this invention various changes may be made in the form, details, proportion and arrangement of parts, the combination thereof, and the mode of operation, which generally stated consist in fork mechanism for refuse container within the scope of the appended claims.

The invention having thus been described, the following is claimed:

1. Mechanism for moving a refuse retainer with respect to a refuse container which has an upper part provided with an opening therein for recept of refuse from the refuse retainer, the mechanism being of the type provided with support structure attached to the refuse container, an arm pivotally attached to the support structure and movable adjacent the refuse container, the arm being pivotally movable to a position adjacent the opening in the refuse container, a fork pivotally attached to the arm and movable by the arm to a position adjacent the opening in the refuse container, the improvement comprising: a reciprocally operable fluid motor including an elongate housing member and an actuator member, the housing member having an internal cylindrical chamber, one of the members of the fluid motor being pivotally attached to the arm, the other member of the fluid motor being pivotally attached to the fork for pivotal movement of the fork with respect to the arm, the actuator member including an axially movable piston rod within the chamber of the housing member and secured to the piston rod, at least three spaced-apart pistons within the chamber of the housing member and fixedly attached to the piston rod, the housing member being provided with at least three spaced-apart fluid parts in communication with the chamber for introducing fluid into the chamber of the housing member and for exhausting fluid from the chamber of the housing member, there being at least one piston between adjacent fluid ports of the fluid motor, the fluid motor thus being operable to accurately position the piston rod at any one of a plurality of positions with respect to the housing member, the fork thus being pivotally movable by the fluid motor to any one of a plurality of pivotal positions with respect to the arm, and the fork thus being pivotally movable and being adapted to engage a refuse retainer for moving the refuse retainer with movement of the arm to a position adjacent the opening in the refuse container for discharging the contents of the refuse retainer into the opening of the refuse container.

2. The mechanism of claim 1 in which the chamber within the elongate housing has constant transverse dimensions throughout the length thereof.

3. The mechanism of claim 1 in which the chamber within the elongate housing is free of fixed transverse barriers throughout the length of the chamber so that fluid is free to flow between adjacent pistons.

4. The mechanism of claim 1 in which the housing member is provided with at least four spaced-apart ports which are in communication with the chamber.

5. The mechanism of claim 1 in which the pistons which are fixedly attached to the piston rod are equally spaced apart.

6. Mechanism for moving a refuse retainer with respect to a refuse container which has an upper part provided with an opening therein for receipt of refuse from the refuse retainer, comprising:

support structure attached to the refuse container, a pair of arms pivotally attached to the support structure and movable adjacent the refuse container, the arms being pivotally movable to a position adjacent the opening in the refuse container, a pair of forks, there being one fork pivotally attached to each arm, a pair of reciprocally operable fluid motors, each fluid motor including a housing member provided with a chamber therein, each fluid motor also including an actuator member which includes an axially movable piston rod within the chamber of the housing member and extending from the housing member, at least three spaced-apart coaxial pistons within the housing member and fixedly attached to the piston rod, the actuator member of each fluid motor being pivotally attached to one of the forks, the housing member of each fluid motor being pivotally attached to the respective arm, each housing member having a least four spaced-apart fluid ports in communication with the chamber of the housing member, there being a least one piston within the chamber between each pair of adjacent fluid ports of the housing member, the fluid motors thus being operable to position the piston rods thereof at any one of a plurality of positions, the forks thus being pivotally movable by the fluid motors to any one of a plurality of positions with respect to the arms, and the forks being adapted to pivotally move and to move with the arms to engage a refuse retainer for moving the refuse retainer to a position adjacent the opening in the refuse container for discharging the contents of the refuse retainer into the opening of the refuse container.

* * * * *